United States Patent Office 3,096,332
Patented July 2, 1963

3,096,332
4,6 - BIS(TRIHALOMETHYL) OR 4,6 - DILOWERAL-KYL-2-(5-NITROFURYL)-PYRIMIDINES
Anne Mary Von Esch, North Chicago, Ill., and William Reese Sherman, University City, Mo., assignors to Abbott Laboratories, Chicago, Ill., a corporation of Illinois
No Drawing. Filed Oct. 19, 1961, Ser. No. 146,364
5 Claims. (Cl. 260—251)

This invention relates to novel derivatives of 5-nitro-2-furylamidine having the formula

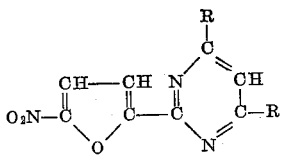

wherein each R is loweralkyl of from 1 to 4 carbon atoms, inclusive, or trihalomethyl such as $CF_3$, $CBr_3$, $Cl_3$ or $CCl_3$ and methods for their preparation.

These compounds are crystalline solids only slightly soluble in water and are active as antibacterial agents. They are, accordingly, useful as toxic constituents of disinfectant compositions for the control of bacteria such as *Salmonella typhimurium* and *Escherichia coli*. For such use, they can be dispersed on an inert, finely divided solid and employed as a dust or dispersed in water and employed as a spray. In a typical operation, 2-(5-nitro-2-furyl)-4,6-dimethylpyrimidine when applied as an aqueous dispersion in a concentration of 50 parts per million completely retarded the growth of the aforementioned microorganisms.

The new compounds with which this invention is concerned can be conveniently prepared by refluxing equimolar quantities of 5-nitro-2-furylamidine hydrochloride and a compound of the formula

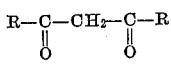

wherein each R is loweralkyl or trihalomethyl in an acidic condensation medium such as a mixture of sodium acetate and glacial acetic acid, thereafter concentrating the reaction mixture and recrystallizing the residue from a suitable organic solvent such as ethanol.

The following examples are presented to illustrate rather than limit the invention.

EXAMPLE 1

*2-(5-Nitro-2-Furyl)-4,6-Dimethylpyrimidine*

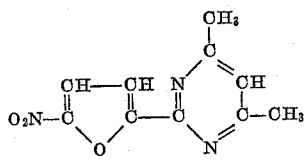

A mixture of 9.6 grams (0.05 mole) of 5-nitro-2-furylamidine hydrochloride, 5.1 grams (0.05 mole) of 2,4-pentanedione, 8.2 grams (0.1 mole) of sodium acetate and 100 ml. of glacial acetic acid was refluxed for 2 hours. The reaction mixture was then concentrated under vacuum and the residue recrystallized from ethanol to obtain the desired 2-(5-nitro-2-furyl)-4,6-dimethylpyrimidine as a crystalline solid melting at 145°–146° C. Upon analysis, the product was found to contain 18.98% nitrogen compared to the calculated value of 19.17% nitrogen.

By substituting 3,5-heptanedione, 4,6-nonanedione or 5,7-undecanedione for the 2,4-pentanedione in the above example, there is obtained 2-(5-nitro-2-furyl)-4,6-diethyl-pyrimidine, 2-(5-nitro-2-furyl)-4,6-di-n-propylpyrimidine and 2-(5-nitro-2-furyl)-4,6-di-n-butylpyrimidine, respectively.

EXAMPLE 2

*2-(5-Nitro-2-Furyl)-4,6-Di-(Trifluoromethyl)-Pyrimidine*

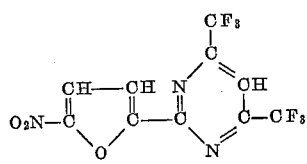

A mixture of 1.9 grams (0.01 mole) of 5-nitro-2-furylamidine hydrochloride, 2.1 grams (0.01 mole) of bis-trifluoroacetylmethane, 1.6 grams (0.02 mole) of sodium acetate and 25 ml. of glacial acetic acid was refluxed for 2 hours. The reaction mixture was thereafter concentrated under vacuum and the residue recrystallized from ethanol to obtain the desired 2-(5-nitro-2-furyl)-4,6-di-(trifluoromethyl)-pyrimidine as a crystalline, cream-colored solid melting at 107°–108° C. which contained 12.85% nitrogen corresponding to the theoretical nitrogen content.

By substituting bis-trichloroacetylmethane, bis-tribromoacetylmethane or bis-triiodoacetylmethane for bis-trifluoroacetylamethane in the above example, there is obtained 2-(5-nitro-2-furyl)-4,6-di-(trichloromethyl)-pyrimidine, 2-(5-nitro-2-furyl) - 4,6 - di-(tribromomethyl)-pyrimidine and 2-(5-nitro-2-furyl)-4,6-di-(triiodomethyl)-pyrimidine, respectively.

The 5-nitro-2-furylamidine hydrochloride employed as a starting material in this invention is a crystalline solid melting at 249° C. It can be readily prepared by the reaction of equimolecular proportions of 5-nitro-2-furylnitrile and ethanol at room temperature in ether saturated with hydrogen chloride and suspending the solid which forms in liquid ammonia. Upon evaporation of the ammonia, the intermediate ethyl 5-nitro-2-furylimidate is obtained which is thereafter refluxed with an equimolar amount of ammonium chloride in methanol and eventually concentrating the reaction mixture to precipitate the 5-nitro-2-furylamidine hydrochloride formed.

What we claim is:
1. A compound of the formula

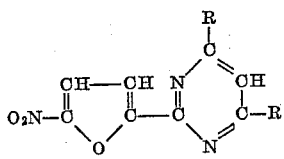

wherein each R is a member of the group consisting of loweralkyl and trihalomethyl.
2. A compound as claimed in claim 1 in which each R is loweralkyl.
3. A compound as claimed in claim 1 in which each R is trihalomethyl.
4. 2-(5-nitro-2-furyl)-4,6-dimethylpyrimidine.
5. 2-(5-nitro-2-furyl)-4,6-di-(trifluoromethyl) - pyrimidine.

References Cited in the file of this patent
UNITED STATES PATENTS
2,660,579   Scholz et al. _____ Nov. 24, 1953

OTHER REFERENCES
Haley et al.: J. Chem. Soc., London (1951), pages 3155–74 at pages 3160–1.